United States Patent
Yamaura

(10) Patent No.: US 10,847,831 B2
(45) Date of Patent: Nov. 24, 2020

(54) END PLATE OF FUEL CELL STACK

(71) Applicant: TOYOTA BOSHOKU KABUSHIKI KAISHA, Aichi-ken (JP)

(72) Inventor: Kunihiro Yamaura, Tokai (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 11 days.

(21) Appl. No.: 15/918,451

(22) Filed: Mar. 12, 2018

(65) Prior Publication Data

US 2018/0277877 A1 Sep. 27, 2018

(30) Foreign Application Priority Data

Mar. 23, 2017 (JP) .................................. 2017-057935

(51) Int. Cl.
*H01M 8/2485* (2016.01)
*H01M 8/2475* (2016.01)

(52) U.S. Cl.
CPC ....... *H01M 8/2475* (2013.01); *H01M 8/2485* (2013.01)

(58) Field of Classification Search
CPC ...... H01M 8/2465–2485; H01M 8/2475–2485
See application file for complete search history.

(56) References Cited

U.S. PATENT DOCUMENTS

| | | | |
|---|---|---|---|
| 6,770,396 B2 * | 8/2004 | Hatoh | H01M 8/0221 429/437 |
| 10,069,125 B2 * | 9/2018 | Yashiki | B65H 75/265 |
| 2016/0075196 A1 * | 3/2016 | Corghi | B60C 25/056 |

FOREIGN PATENT DOCUMENTS

| | | | |
|---|---|---|---|
| JP | 2007035558 A | * | 2/2007 |
| JP | 2016-134335 | | 7/2016 |
| JP | 2016134335 A | * | 7/2016 |

OTHER PUBLICATIONS

"Shrinkage and warpage". SCU Engineering Design Center. (Dec. 4, 2016). Retrieved via Wayback Machine Jun. 4, 2019, from http://www.dc.engr.scu.edu/cmdoc/dg_doc/develop/process/physics/b3500001.htnn (Year: 2016).*
EPO machine generated English translation of JP 2007-035558 (Year: 2007).*
EPO machine generated English translation of JP 2016-134335 (Year: 2016).*

* cited by examiner

*Primary Examiner* — Christopher P Domone
*Assistant Examiner* — Kimberly Wyluda
(74) *Attorney, Agent, or Firm* — Greenblum & Bernstein, P.L.C.

(57) ABSTRACT

An end plate of a fuel cell stack includes a metal plate body including a plurality of through holes and a resin cover that covers a wall surface defining each of the through holes. The cover includes a body, a flange projecting outward in a radial direction from an outer end of the body, an annular rim extending toward the inner side from an outer edge of the flange, and a coupling rib that couples an inner circumferential surface of the rim to an outer circumferential surface of the body. The plate body further includes an outer end surface including a recess. The recess is filled with the flange, the rim, and the coupling rib.

13 Claims, 3 Drawing Sheets

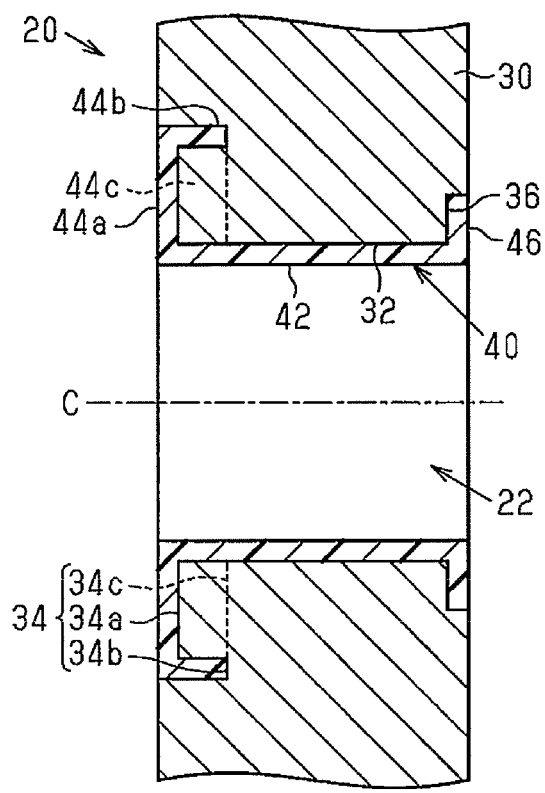
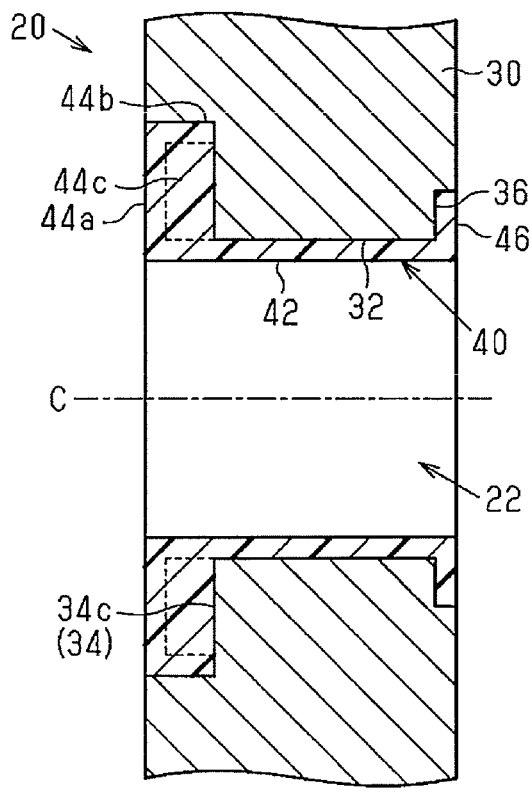

END PLATE OF FUEL CELL STACK

BACKGROUND OF THE INVENTION

The present disclosure relates to an end plate arranged on an end of a cell stack body of a fuel cell stack in a stacking direction and including a plurality of circulation holes through which a fluid flows to and from flow passages in the cell stack body.

A fuel cell includes a fuel cell stack. The fuel cell stack includes a cell stack body formed by stacking a plurality of plate-shaped battery cells in a thickness-wise direction, two end plates located at opposite sides of the cell stack body in a stacking direction, and a plurality of connection pipes connected to the end plates (for example, refer to Japanese Laid-Open Patent Publication No. 2016-134335).

Japanese Laid-Open Patent Publication No. 2016-134335 (D1) describes an end plate including a plurality of circulation holes through which anode gas, cathode gas, and a cooling medium (hereinafter referred to as the fluid) respectively flow to and from a plurality of flow passages formed in the cell stack body. The end plate described in publication D1 includes a metal plate body including a plurality of through holes that form the circulation holes and resin covers that cover the wall surfaces defining the through holes. The covers are formed integrally with the plate body through insert-molding performed by arranging the plate body in a mold and injecting molten resin into the mold.

The end plate disclosed in FIG. 3 of publication D1 includes recesses formed in two end surfaces of the plate body. The recesses increase the diameter of the two ends of each corresponding through hole. The recesses are filled with an outer flange and an inner flange that form parts of the cover. The flanges restrict the separation of the cover from the plate body.

FIG. 4 of publication D1 discloses a cover including a rim extending inward from the outer edge of the outer flange.

FIG. 5 of publication D1 discloses an end plate including a plurality of communication holes through which the outer circumferential portions of the two recesses of the plate body are in communication. The communication holes are filled with coupling portions that form parts of the cover.

SUMMARY OF THE INVENTION

The end plates of publication D1 have shortcomings that will now be described. In the end plate illustrated in FIG. 4 of D1, as shown by the double-dashed lines in accompanying FIG. 6, when a cover 140 cools and contracts after undergoing molding, there is a tendency of gaps forming between an outer flange 142 or a rim 144 and a plate body 130. Thus, when an end plate 120 shown in FIG. 6 is used in a vehicle fuel cell, in coastal areas, for example, salt water may enter the gaps and corrode the plate body 130 or deposit salt on the surface of the plate body 130 that raises and deforms the cover 140. The same problem may occur in the end plate illustrated in FIG. 3 of publication D1.

In the end plate illustrated in FIG. 5 of publication D1, the outer flange is coupled to the inner flange by the coupling portion. As compared with the end plates illustrated in FIGS. 3 and 4 of D1, this may limit the formation of gaps between the outer flange and the plate body resulting from contraction after undergoing molding. However, in this case, the arrangement of the coupling portions over the entire plate body in the thickness-wise direction increases the amount of resin.

It is an object of the present invention to provide an end plate of a fuel cell stack that restricts the entrance of liquid into the end plate between the plate body and the cover with a simple structure.

According to one aspect of the present invention, an end plate of a fuel cell stack is arranged on an end of a cell stack body of the fuel cell stack in a stacking direction and includes a plurality of circulation holes through which a fluid flows to and from flow passages in the cell stack body. The end plate includes a metal plate body including a plurality of through holes that form the circulation holes and a resin cover that covers a wall surface defining each of the through holes. When referring to a side of the plate body in a thickness-wise direction that is closer to the cell stack body as an inner side and a side of the plate body that is farther from the cell stack body as an outer side, the cover includes a body that covers the wall surface of the corresponding through hole, a flange projecting outward in a radial direction from an outer end of the body, an annular rim extending from an outer edge of the flange toward the inner side, and a coupling rib that couples an inner circumferential surface of the rim to an outer circumferential surface of the body. The plate body further includes an outer end surface including a recess. The recess is filled with the flange, the rim, and the coupling rib.

Other aspects and advantages of the present invention will become apparent from the following description, taken in conjunction with the accompanying drawings, illustrating by way of example the principles of the invention.

BRIEF DESCRIPTION OF THE DRAWINGS

FIG. 3 is a cross-sectional view taken along line 3-3 in FIG. 2;

FIG. 4 is a cross-sectional view taken along line 4-4 in FIG. 2;

DETAILED DESCRIPTION OF THE PREFERRED EMBODIMENTS

One embodiment of the present invention will now be described with reference to FIGS. 1 to 5.

Figure 1:
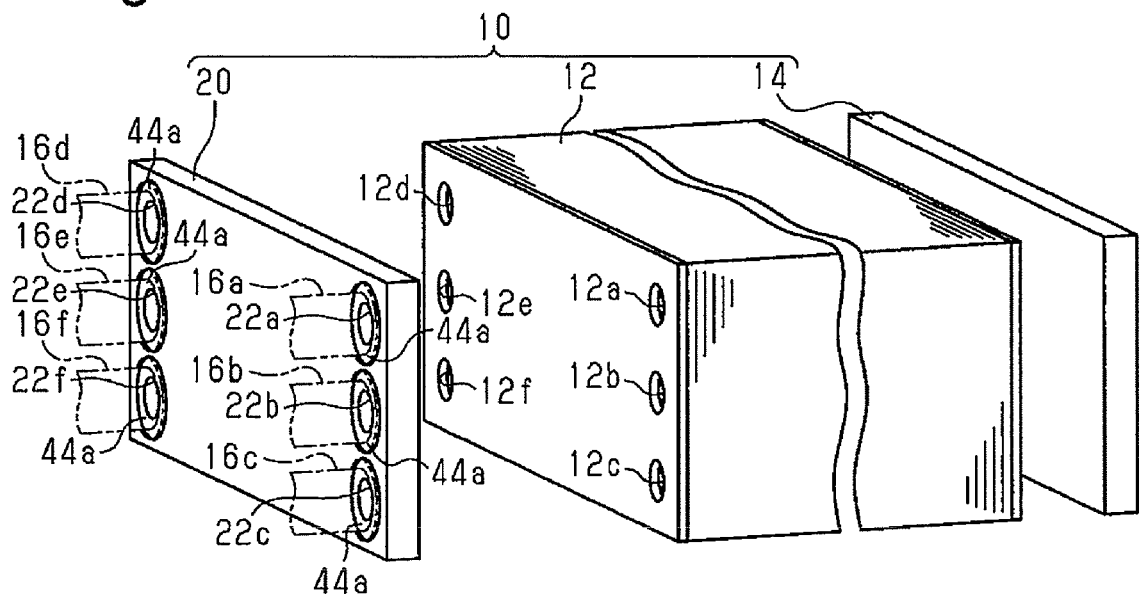
FIG. 1 is an exploded perspective view showing one embodiment of an end plate of a fuel cell stack in which the end plate, a cell stack body, and another end plate are spaced apart from one another.

As shown in FIG. 1, a fuel cell stack 10 includes a cell stack body 12 formed by stacking a plurality of plate-shaped battery cells in a thickness-wise direction and two end plates 14 and 20 located at opposite sides of the cell stack body 12 in a stacking direction.

The cell stack body 12 includes three flow passages 12a to 12c used to supply the battery cells with anode gas (for example, hydrogen gas), cathode gas (for example, oxygen gas in air), and a cooling medium (for example, cooling water), respectively. The cell stack body 12 further includes three flow passages 12d to 12f used to discharge the discharge anode gas, the cathode gas, and the cooling medium that have been used by the battery cells to generate power.

The first end plate 20 includes a plurality of circulation holes 22a to 22f through which the anode gas, the cathode gas, and the cooling medium (hereinafter referred to as the fluid) flow to and from the flow passages 12a to 12f of the cell stack body 12.

The second end plate 14 does not include circulation holes.

Figure 2:
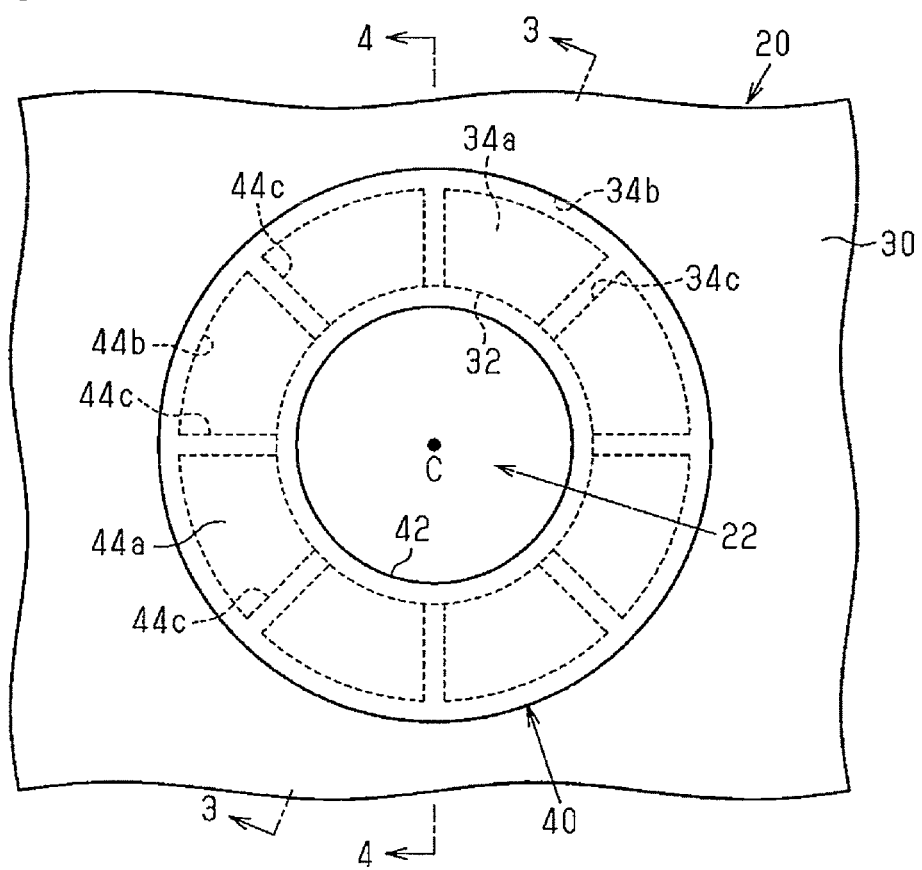
FIG. 2 is a plan view showing a circulation hole in the embodiment of FIG. 1 as viewed from the outer side.

As shown in FIGS. 2 to 4, the end plate 20 includes an aluminum plate body 30 including a plurality of through holes 32 and resin covers 40 that cover the wall surfaces defining the through holes 32. The through holes 32 form the circulation holes 22a to 22f (hereinafter referred to as the circulation holes 22).

In the following description, the "inner side" refers to the side of the plate body 30 in the thickness-wise direction that is closer to the cell stack body 12 (right side in FIGS. 3 and 4), and the "outer side" refers to the side that is farther from the cell stack body 12 (left side in FIGS. 3 and 4).

As shown in FIGS. 2 to 4, each through hole 32 in the plate body 30 is a hole having a circular cross section.

As shown in FIGS. 3 and 4, an outer end surface and an inner end surface of the plate body 30 respectively include an outer recess 34 and an inner recess 36 that are continuous with the through hole 32.

As shown in FIGS. 2 to 4, the outer recess 34 includes a flange recess 34a and a rim recess 34b. The flange recess 34a is a region that is circular in a plan view and corresponds to an outer end of the through hole 32 where the diameter is increased. The rim recess 34b is a tubular region extending from an outer edge of the flange recess 34a toward the inner side. Further, the outer recess 34 includes a plurality of communication recesses 34c through which the rim recess 34b and the through hole 32 are in communication. The communication recesses 34c are arranged at equal intervals in a circumferential direction.

The communication recesses 34c extend radially with respect to the center C of the through hole 32.

As shown in FIGS. 3 and 4, the communication recesses 34c have the same length as the rim recess 34b in the thickness-wise direction of the plate body 30 (sideward direction in FIGS. 3 and 4).

As shown in FIGS. 2 to 4, the cover 40 includes a tubular body 42, an outer flange 44a, a rim 44b, and a plurality of coupling ribs 44c. The outer flange 44a, the rim 44b, and the coupling ribs 44c are formed integrally with the body 42. The wall surface of the through hole 32 is covered by the body 42. The flange recess 34a, the rim recess 34b, and the communication recesses 34c of the outer recess 34 are filled with the outer flange 44a, the rim 44b, and the coupling ribs 44c, respectively. As shown in FIGS. 3 and 4, the cover 40 includes an inner flange 46 that fills the inner recess 36.

The outer flange 44a is annular and projects outward in the radial direction from an outer end of the body 42.

The rim 44b is tubular and extends from an outer edge of the outer flange 44a toward the inner side.

The coupling ribs 44c are arranged at equal intervals in the circumferential direction and couple an inner circumferential surface of the rim 44b to an outer circumferential surface of the body 42.

The coupling ribs 44c extend radially with respect to the center C of the through hole 32.

As shown in FIGS. 3 and 4, the coupling ribs 44c have the same length as the rim 44b in the thickness-wise direction of the plate body 30.

The inner flange 46 is annular and projects outward in the radial direction from an inner end of the body 42.

The covers 40 are formed integrally with the plate body 30 through insert-molding by arranging the plate body 30 in a mold (not shown) and injecting molten resin into the mold.

As shown by the double-dashed lines in FIG. 1, a plurality of connection pipes 16a to 16f through which anode gas, cathode gas, and a cooling medium are supplied or discharged are connected to the circulation holes 22a to 22f of the end plate 20, respectively.

The operation of the present embodiment will now be described.

When arranging the plate body 30 in the mold to mold each cover 40, the body 42 of the cover 40 is molded on the wall surface of the corresponding through hole 32 in the plate body 30. Further, the outer flange 44a, the rim 44b, and the coupling ribs 44c are molded in the outer recess 34 of the plate body 30.

Figure 5:
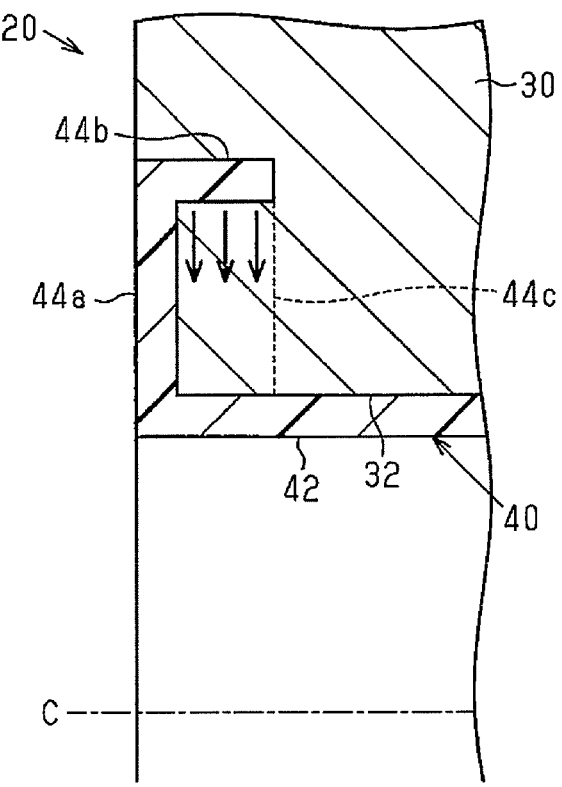
FIG. 5 is a partially enlarged cross-sectional view of FIG. 3.
Figure 6:
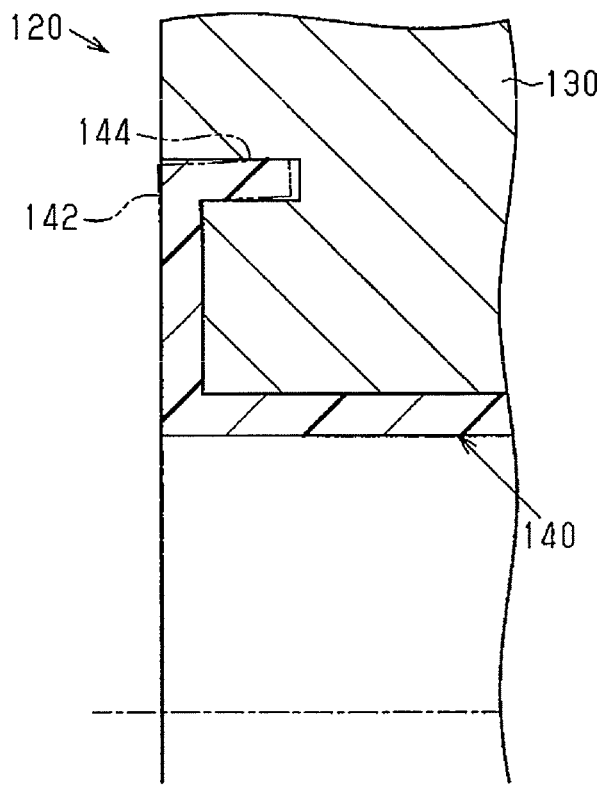
FIG. 6 is a cross-sectional view showing a prior art end plate.

As shown in FIG. 5, the outer circumferential surface of the body 42 is coupled to the inner circumferential surface of the rim 44b by the coupling ribs 44c. Thus, when the cover 40 cools and contracts after undergoing molding, the entire rim 44b in the thickness-wise direction of the plate body 30 is pulled toward the inner circumferential side by the coupling ribs 44c. This increases the adhesion of the inner circumferential surface of the rim 44b and the plate body 30.

For comparison, instead of coupling the rim 44b and the body 42 with the coupling ribs 44c at a number of positions in the circumferential direction, the rim 44b and the coupling ribs 44c are omitted. Further, the outer flange 44a is increased in thickness so as to nearly reach a distal end of the rim 44b.

In this case, the outer flange 44a is excessively thick such that the resin has a tendency to contract excessively after undergoing molding. This may decrease the dimensional accuracy of the outer flange 44a, which serves as a seal surface that contacts the connection pipes 16a to 16f, and adversely affect the sealing of the connection pipes 16a to 16f.

The present embodiment includes the rim 44b and the coupling ribs 44c. This reduces the thickness of the entire cover 40 including the outer flange 44a and avoids excessive contraction after molding is performed. Thus, decreases in the dimensional accuracy of the outer flange 44a are avoided.

The present embodiment has the advantages described below.

(1) The end plate 20 includes the metal plate body 30, which includes the through holes 32, and the resin covers 40, which cover the wall surfaces of the through holes 32. Each cover 40 includes the body 42, which covers the wall surface of the corresponding through hole 32, the outer flange 44a, which projects outward in the radial direction from the outer end of the body 42, the annular rim 44b, which extends from the outer edge of the outer flange 44a toward the inner side, and the coupling ribs 44c that couple the inner circumferential surface of the rim 44b to the outer circumferential surface of the body 42. The outer end surface of the plate body 30 includes the outer recesses 34. Each outer recess 34 is filled with the outer flange 44a, the rim 44b, and the coupling ribs 44c.

With such a structure, the adhesion increases between the inner circumferential surface of the rim 44b and the plate body 30. Thus, the entrance of liquid into the end plate 20 between the plate body 30 and the outer flange 44a of the cover 40 is limited with a simple structure.

(2) The coupling ribs 44c extend in the radial direction with respect to the center of the circulation hole 22.

With such a structure, when the cover 40 contracts after undergoing molding, the rim 44b is pulled toward the center of the circulation hole 22 by the coupling ribs 44c. This increases the adhesion of the inner circumferential surface of the rim 44*b* with the plate body 30.

(3) The coupling ribs 44*c* have the same length as the rim 44*b* in the thickness-wise direction of the plate body 30.

With such a structure, when the cover 40 contracts after undergoing molding, the entire rim 44*b* in the thickness-wise direction of the plate body 30 is pulled toward the inner circumferential side by the coupling ribs 44*c*. This further increases the adhesion of the inner circumferential surface of the rim 44*b* with the plate body 30 and thus effectively limits the entrance of liquid into the end plate 20 between the plate body 30 and the outer flange 44*a*.

(4) The coupling ribs 44*c* are arranged at equal intervals in the circumferential direction of the circulation holes 22.

With such a structure, when the cover 40 contracts after undergoing molding, the rim 44*b* is pulled toward the inner circumferential side by the coupling ribs 44*c*, which are arranged at equal intervals in the circumferential direction. This allows for further uniform adhesion of the inner circumferential surface of the rim 44*b* with the plate body 30 in the circumferential direction.

MODIFIED EXAMPLES

It should be apparent to those skilled in the art that the present invention may be embodied in many other specific forms without departing from the spirit or scope of the invention. Particularly, it should be understood that the present invention may be embodied in the following forms.

The coupling ribs 44*c* may be arranged at unequal intervals in the circumferential direction.

The number of the coupling ribs 44*c* may be changed. That is, there only needs to be one or more coupling ribs 44*c*.

The coupling ribs 44*c* may be shorter than the rim 44*b* in the thickness-wise direction of the plate body 30.

The through hole 32 of the plate body 30 does not have to be circular. For example, the through hole 32 may be a hole having a square cross section.

Therefore, the present examples and embodiments are to be considered as illustrative and not restrictive and the invention is not to be limited to the details given herein, but may be modified within the scope and equivalence of the appended claims.

The invention claimed is:

1. An end plate of a fuel cell stack arranged on an end of a cell stack body of the fuel cell stack in a stacking direction of the fuel cell stack and including a plurality of circulation holes through which a fluid flows to and from flow passages in the cell stack body, the end plate comprising:
a metal plate body including a plurality of through holes that form the circulation holes; and
a resin cover that covers a wall surface defining each of the through holes,
wherein a side of the plate body in a thickness direction that is closer to the cell stack body comprises an inner side, and a side of the plate body that is farther from the cell stack body comprises an outer side,
the cover includes
a body that covers the wall surface of the corresponding through hole, the through hole extending from inner side to the outer side of the plate body,
a flange projecting outward in a radial direction from an outer end of the body,
an annular rim extending from an outer edge of the flange toward the inner side, and
a coupling rib that couples an inner circumferential surface of the rim to an outer circumferential surface of the body, the coupling rib having an extent, in the thickness direction, less than a distance between the inner and outer sides of the plate body, and
the plate body further includes an outer end surface including a recess, wherein the recess is filled with the flange, the rim, and the coupling rib.

2. The end plate according to claim 1, wherein the coupling rib extends in the radial direction with respect to a center of the circulation hole.

3. The end plate according to claim 1, wherein the coupling rib has a length that is the same as a length of the rim in the thickness direction of the plate body.

4. The end plate according to claim 1, wherein a plurality of coupling ribs are arranged at intervals in a circumferential direction of the circulation hole.

5. The end plate according to claim 4, wherein the coupling ribs are arranged at equal intervals in the circumferential direction of the circulation hole.

6. The end plate according to claim 1, wherein the flange, the rim and the coupling rib fill an entire volume of the recess.

7. The end plate according to claim 1, wherein the recess further comprises a rim recess filled with the rim and a communication recess through which the rim recess and the through hole are in communication, wherein the communication recess is filled with the coupling rib.

8. The end plate according to claim 4, wherein the recess further comprises a rim recess filled with the rim and a plurality of communication recesses through which the rim recess and one of the through holes are in communication, wherein each of the communication recesses is filled with one of the coupling ribs.

9. The end plate according to claim 1, the coupling rib increasing adhesion between an inner circumferential surface of the rim and the plate body, and pulling the rim inwardly upon contraction of the cover.

10. The end plate according to claim 1, wherein the flange, the annular rim and the coupling rib are positioned on the outer side of the plate body, and an inner flange is positioned within an inner recess on the inner side of the plate body.

11. The end plate according to claim 1, wherein a size of each of the through holes on the inner side of the plate body is equal to a size of each of the through holes on the outer side of the plate body.

12. The end plate according to claim 1, wherein a shape of each through hole is the same on the inner side and on the outer side of the plate body.

13. The end plate according to claim 1, wherein each through hole comprises a right cylindrical hole.

\* \* \* \* \*